United States Patent
Zhang et al.

(10) Patent No.: US 8,094,396 B1
(45) Date of Patent: Jan. 10, 2012

(54) MEDIA DEFECT SCAN

(75) Inventors: Baoliang Zhang, Foothill Ranch, CA (US); Teik Ee Yeo, Trabuco Canyon, CA (US); Johanes S. Ma, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/704,105

(22) Filed: Feb. 11, 2010

(51) Int. Cl.
*G11B 27/36* (2006.01)
(52) U.S. Cl. .......................................... 360/31
(58) Field of Classification Search .................. None
See application file for complete search history.

(56) References Cited

U.S. PATENT DOCUMENTS

| | | | |
|---|---|---|---|
| 5,195,076 A | 3/1993 | Aoki | |
| 5,280,395 A | 1/1994 | Matsuzaki | |
| 6,104,556 A * | 8/2000 | Schaenzer | 360/25 |
| 6,292,913 B1 | 9/2001 | Son | |
| 6,366,081 B1 | 4/2002 | Tan et al. | |
| 6,504,662 B2 | 1/2003 | Sobey | |
| 6,606,211 B1 | 8/2003 | Lim et al. | |
| 6,731,442 B2 | 5/2004 | Jin et al. | |
| 6,947,232 B2 | 9/2005 | Lim et al. | |
| 7,072,129 B1 | 7/2006 | Cullen et al. | |
| 7,522,366 B2 | 4/2009 | Mettler et al. | |
| 7,525,307 B2 | 4/2009 | Shen | |
| 7,567,397 B2 | 7/2009 | Lu | |
| 7,656,763 B1 | 2/2010 | Jin et al. | |
| 2004/0153949 A1 | 8/2004 | Ro et al. | |
| 2005/0180282 A1 | 8/2005 | Ouyang et al. | |
| 2006/0066971 A1 | 3/2006 | Alex et al. | |
| 2007/0279788 A1 * | 12/2007 | Andersen et al. | 360/53 |
| 2008/0010509 A1 | 1/2008 | Southerland et al. | |
| 2008/0168315 A1 | 7/2008 | Mead et al. | |
| 2008/0189469 A1 | 8/2008 | Mettler et al. | |

* cited by examiner

*Primary Examiner* — Daniell L Negron
*Assistant Examiner* — Regina N Holder

(57) ABSTRACT

A disk drive is disclosed comprising a disk, a head for writing data to the disk, and control circuitry coupled to the head. The control circuitry is operable to write data to the plurality of data tracks, read a first data area of a first data track to generate a first read back signal, determine a first quality metric and a channel flag in response to the first read back signal, determine that the first quality metric exceeds a first threshold, apply additional stress to the first data area, reread the first data area to generate a second read back signal, determine a second quality metric in response to the second read back signal, and determine whether the second quality metric exceeds a second threshold.

31 Claims, 8 Drawing Sheets

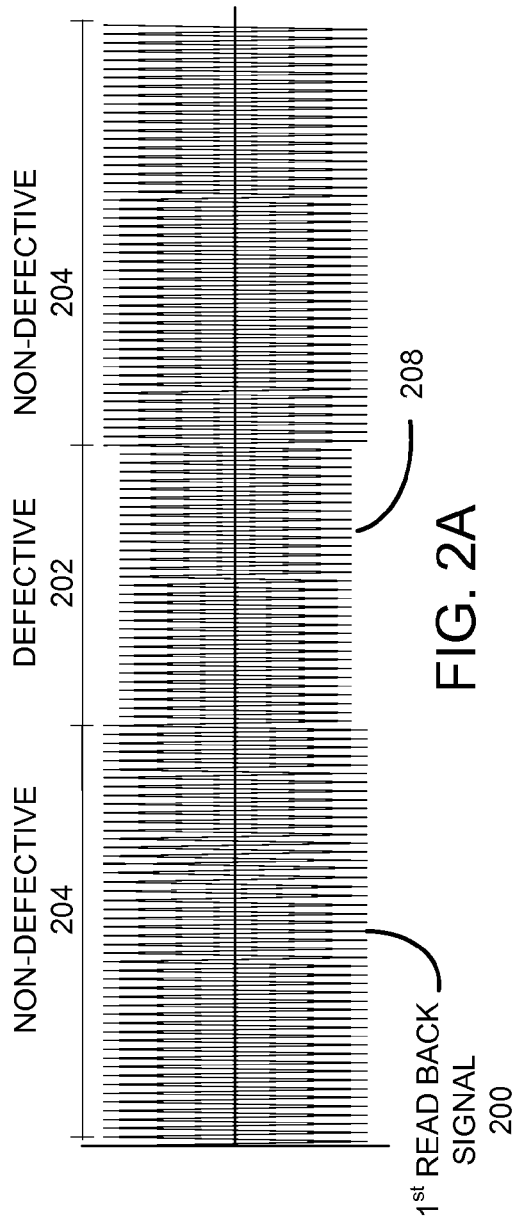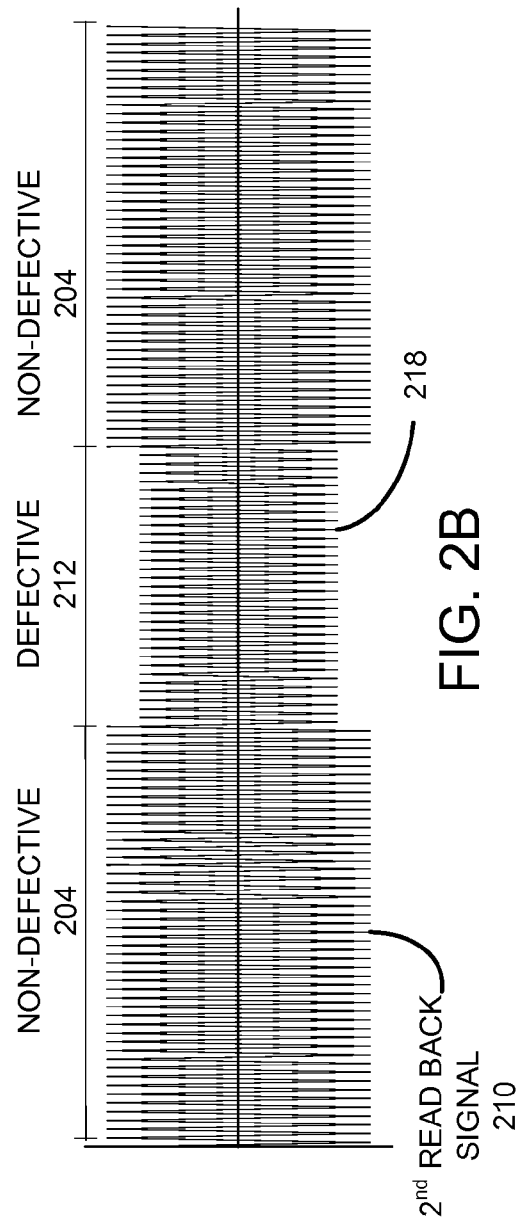

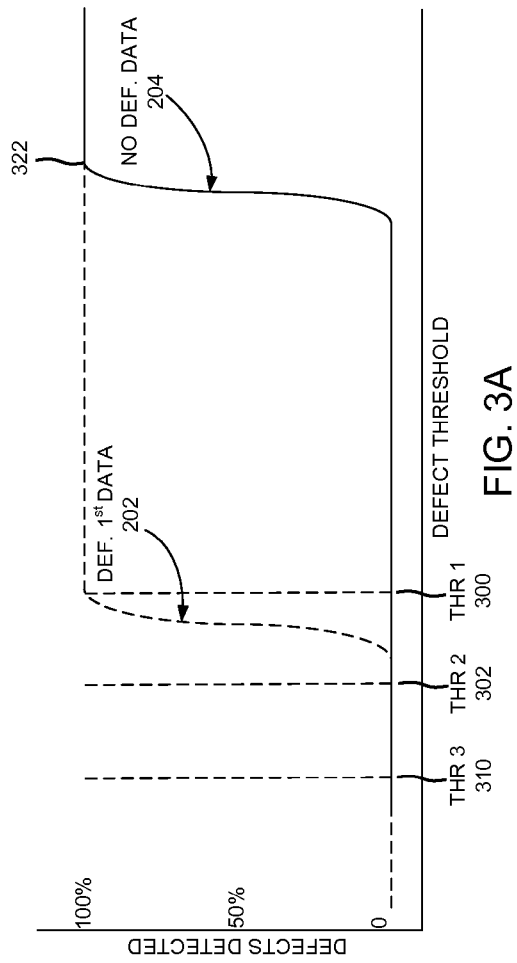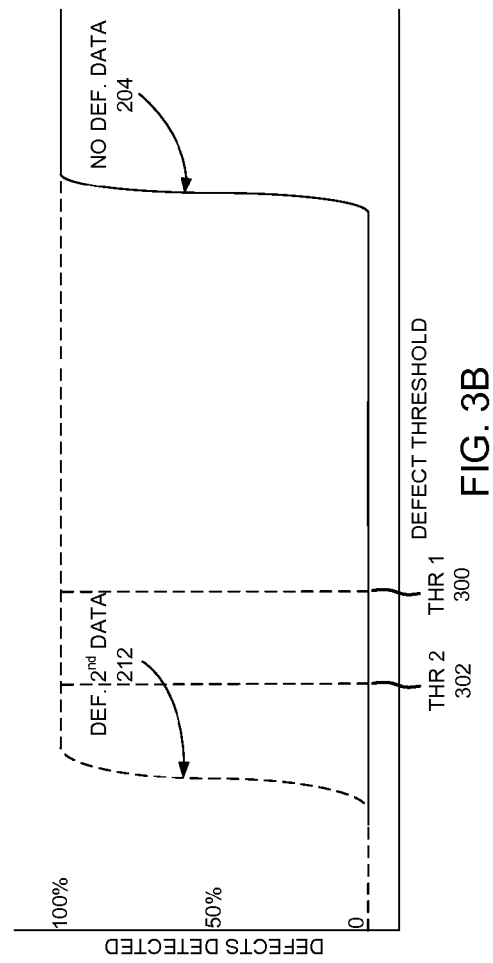

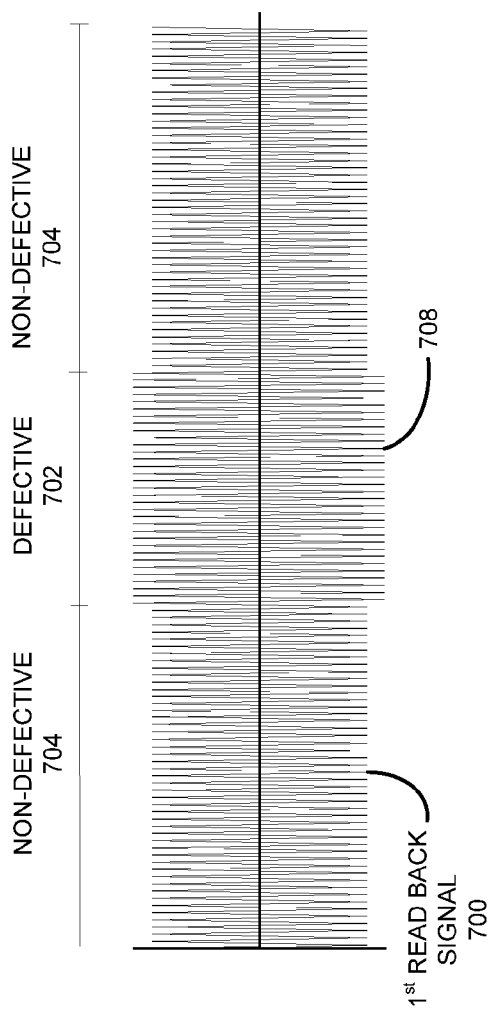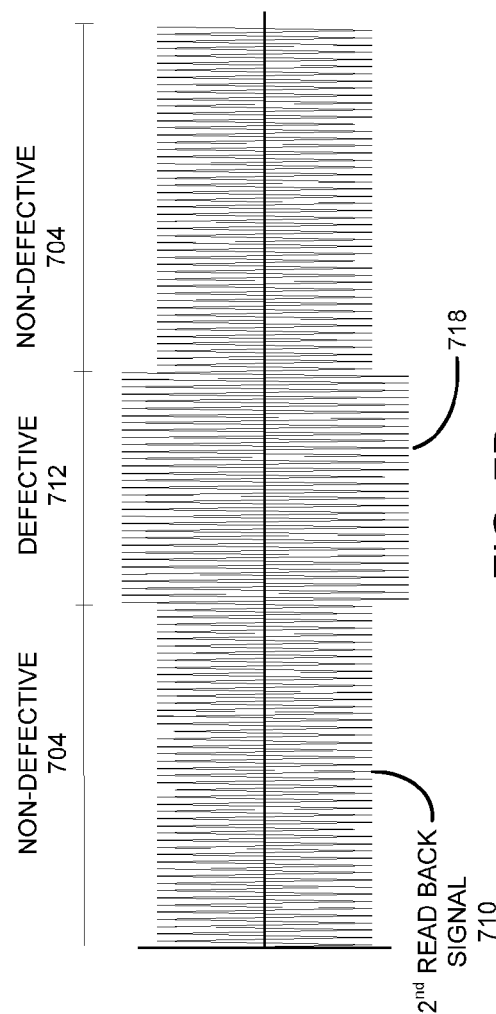

MEDIA DEFECT SCAN

BACKGROUND

A disk in a disk drive is coated with a magnetic material which is magnetized with a write element (e.g., a write coil) in order to record information onto the surface of the disk. Various influences may render portions of the disk surface unusable (i.e., defective), for example, if the magnetic coating is not evenly applied to the disk surface or if a particle contaminates the magnetic coating. During a manufacturing "defect scan" procedure, the defective areas of the disk are located and "mapped out" so they are not used during normal operation. The defect scan typically entails writing a high frequency pattern (e.g., a 2T pattern) to the disk, and then reading the high frequency pattern while monitoring a quality metric, such as an amplitude of the read signal, an amplitude drop-out of the read signal, a mean-squared-error of the read signal, a bit error of the read signal, a timing error of the read signal, or the output of defect scan filters having impulse responses matched to defect signatures. If the quality metric falls below a predetermined defect scan threshold, a defect is detected.

The disk is typically formatted to comprise a plurality of radially spaced, concentric data tracks each comprising a number of data sectors, wherein the defect scan maps defective data sectors to spare data sectors. If a defective data sector is not detected during the defect scan procedure, there is a risk of catastrophic data loss, either immediately, or over time as the uniform alignment of the magnetic grains deteriorates (magnetic entropy). Conversely, if the defect scan threshold is set too low in an attempt to detect more defective data sectors, more good data sectors will be identified as defective and mapped out unnecessarily, thereby reducing the capacity and performance of the disk drive.

Accordingly, what is needed is a system and method for providing an improved media defect scan procedure for a disk drive.

BRIEF DESCRIPTION OF SEVERAL VIEWS OF THE DRAWINGS

FIG. 2A illustrates an example first read back signal corresponding to a 2T pattern written in a first data area according to an embodiment of the present invention.

FIG. 2B illustrates an example second read back signal corresponding to a 2T pattern written in the first data area according to an embodiment of the present invention.

FIG. 3A illustrates a plot of example percent probability of defects detected versus defect threshold levels comprising three defect thresholds according to an embodiment of the present invention.

FIG. 3B illustrates a plot of example percent probability of defects detected versus defect threshold levels corresponding to the application of additional stress according to an embodiment of the present invention.

FIG. 7A illustrates an example first read back signal corresponding to data written in a first data area according to an embodiment of the present invention.

FIG. 7B illustrates an example second read back signal comprising defective second data and the second non-defective data resulting from applying additional stress comprising an increased write current to the first data area of the first data track according to an embodiment of the present invention.

DETAILED DESCRIPTION

Figure 1A:
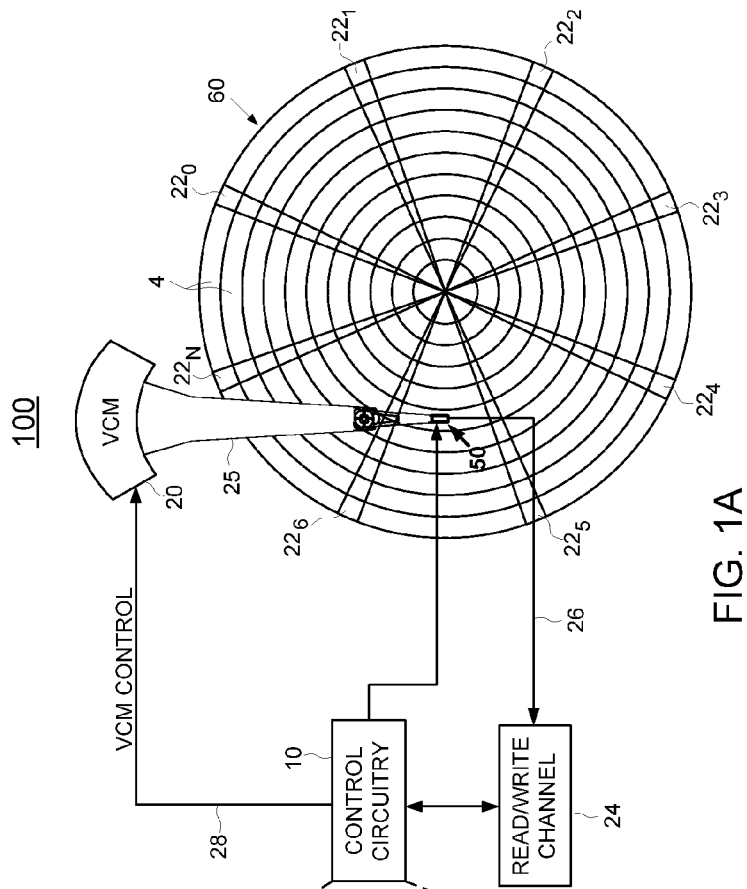
FIG. 1A shows a disk drive according to an embodiment of the present invention comprising a disk, a head actuated over the disk, and control circuitry.

FIG. 1A shows a disk drive 100 according to an embodiment of the present invention comprising a disk 60 having a plurality of data tracks 4, and a head 50 actuated over the disk 60. The disk drive 100 further comprises control circuitry 10 which executes the flow diagram of FIG. 1B wherein the control circuitry 10 at step 11 writes data to the plurality of data tracks 4 and at step 12 reads a first data area of a first data track to generate a first read back signal. At step 13, the control circuitry 10 determines a first quality metric and a channel flag in response to the first read back signal. At step 14, the control circuitry determines that the first quality metric exceeds a first threshold. Then, at step 15, the control circuitry 10 applies additional stress to the first data area in response to the channel flag and, at step 16, rereads the first data area to generate a second read back signal. The control circuitry 10 then determines a second quality metric in response to the second read back signal (step 17) and determines whether the second quality metric exceeds a second threshold (step 18).

Any suitable control circuitry 10 may be employed to implement the embodiments of the present invention. In one embodiment, the control circuitry 10 comprises a microprocessor executing instructions, the instructions being operable to cause the microprocessor to perform the steps of FIG. 1B as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 60 and read into a volatile semiconductor memory when the disk drive is powered on. In yet another embodiment, the control circuitry 10 comprises suitable logic circuitry, such as state machine circuitry. Additionally, in some embodiments, the control circuitry 10 may comprise some portions of or all of the read/write channel 24.

In the embodiment of FIG. 1A, the head 50 is connected to a distal end of an actuator arm 25 which is rotated about a pivot by a voice coil motor (VCM) 20 in order to actuate the head 50 radially over the disk 60. The VCM 20 comprises a voice coil which, when energized with current by the control circuitry 10, generates a magnetic flux which interacts with the magnetic flux from permanent magnets to generate a torque that rotates the actuator arm 25 about the pivot. Also in the embodiment of FIG. 1A, the disk 60 comprises a plurality of embedded servo sectors $22_0$-$22_N$ each comprising coarse head position information, such as a track address, and fine head position information, such as servo bursts. As the head 50 passes over each servo sector, a read/write channel 24 processes the read back signal 26 emanating from the head 50 to demodulate the position information. The read/write channel 24 may comprise multiple detectors to process the read back signal 26. Each detector may be capable of providing a channel flag to the control circuitry 10. The control circuitry 10 processes the position information to generate a control signal 28 applied to the VCM 20. The VCM 20 rotates the actuator arm 25 in order to position the head 50 over a target track during the seek operation, and maintains the head 50 over the target track during a tracking operation.

In one embodiment, the disk drive 100 of FIG. 1A comprises a production disk drive, and in an alternative embodiment, the disk drive 100 of FIG. 1A comprises a special manufacturing disk drive, such as a spin stand. In one embodiment, each production disk drive 100 executes the flow diagram of FIG. 1B to identify a defect.

In one embodiment, the control circuitry 10 initiates a defect scan by writing data, such as 2T sinusoidal data, to some or all of the plurality of data tracks 4. In other embodiments, user data may be written to the plurality of data tracks 4, such as random data. The control circuitry 10 then reads a first data area of a first data track to generate a first read back signal, such as first read back signal 200 illustrated in the example of FIG. 2A according to one embodiment of the invention. The first read back signal 200 comprises defective first data 202 read from a defective data area and second non-defective data 204 read from a second non-defective data area of the first data area of the first data track. The control circuitry 10 processes the first read back signal 200 using a suitable defect detection algorithm to identify the defective data area (e.g., a first data sector or a first data wedge) that is substantially affected by a defect, and the second non-defective data area (e.g., second data sectors or a second data wedges) that are substantially free from defects. For example, the defective data area may be identified by performing the defect scan on each data sector or data wedge on a track of disk 60 utilizing a first threshold.

The control circuitry 10 determines a first quality metric and a channel flag in response to the first read back signal 200. In one embodiment, the defect detection algorithm may comprise determining the first quality metric corresponding to a percentage drop-out of the amplitude of the first read back signal 200. The percentage amplitude drop-out of the first read back signal 200 may comprise an average value of an amplitude drop-out averaged over a sample period (P) of the first read back signal 200. In other embodiments, the first quality metric may be based on the percentage of ECC errors in the first read back signal 200. In one embodiment, the defect detection algorithm may also identify and quantify the channel flag in the read channel 24 of disk drive 100. The channel flag may indicate a type of error in the first read back signal 200 that corresponds to a type of defect. The channel flag may also identify the location of the defective data area of the first data track on the disk 60. The channel flag may also indicate that the first quality metric exceeds the first threshold.

FIG. 3A illustrates a plot of example percent probability of defects detected versus defect threshold levels comprising three defect thresholds according to an embodiment of the present invention. FIG. 3A further illustrates the percentage of reads wherein the defective first data 202 is identified as defective (y-axis) relative to a defect scan threshold (x-axis). The defective first data 202 may be characterized by the first quality metric corresponding to the percentage amplitude drop-out of the first read back signal 200 as shown in FIG. 2A.

At low defect scan thresholds (closer to the y-axis), the data areas are identified as non-defective during every read operation. As the defect scan threshold increases (moving right along the x-axis), the defective first data 202 is identified as defective during at least one read operation, and then gradually increases as the threshold increases until the defective first data 202 is identified as defect during 100% of the read operations at a first threshold THR 1 300. The first threshold THR 1 300 may comprise a first percentage amplitude drop-out of the first read back signal 200. A similar curve is shown for the non-defective data 204 wherein at data point 322, even the non-defective data 204 is identified as defective during 100% of the read operations. The data point 322 corresponds to a threshold that may comprise a 1% amplitude drop-out of the first read back signal 200.

Note also that in FIG. 3A, a lower second threshold THR 2 302 is not exceeded, i.e., there is a 0% probability that a defect is detected at the lower THR 2 302. The lower second threshold THR 2 302 may be utilized to confirm the presence of a defect if the higher first threshold THR 1 300 is exceeded.

The control circuitry 10 determines that the first quality metric exceeds the first threshold THR 1 300. For example, as illustrated in FIG. 3A, the quality metric corresponding to the first defective data 202 is compared to the THR 1 300. The higher THR 1 300 is exceeded, i.e., there is a 100% probability that a defect is detected at the THR 1 300.

The first threshold THR 1 300 may comprise the first percentage amplitude drop-out of the first read back signal 200. For example, THR 1 300 may equal a 20% amplitude drop from an expected or nominal amplitude according to an embodiment of the invention. Thus, for the THR 1 300 to be exceeded, the first quality metric corresponding to the amplitude drop-out of the first read back signal 200 must equal or be above a 20% amplitude drop. Any appropriate percentage amplitude drop-out may be selected for THR 1 300 according to embodiments of the invention.

The improved media defect scan comprises application of additional stress to further identify potential hidden defects according to embodiments of the invention. One such hidden defect may be a defect that manifests itself as a long amplitude drop-out of the read back signal. FIG. 2A illustrates a long amplitude drop-out 208 (a percentage amplitude drop-out for P periods of the 2T pattern) of the first read back signal 200. This type of hidden defect may not be detected/confirmed at the lower second threshold THR 2 302 as illustrated in FIG. 3A. However, this type of hidden defect may be accentuated by applying additional stress.

In one embodiment, the control circuitry 10 applies additional stress to the first data area in response to the channel flag. The application of additional stress may assist in the detection/confirmation of a defect. The control circuitry 10 rereads the first data area to generate a second read back signal 210, such as shown in FIG. 2B. Then, the control circuitry 10 processes the second read back signal 210 to determine a second quality metric in response to the second read back signal 210. In this embodiment, the defect detection algorithm determines the second quality metric corresponding to a percentage drop-out of the amplitude of the second read back signal 210.

As illustrated in FIG. 2B, the second read back signal 210 comprises a long drop-out 218 with an increased percentage amplitude drop-out resulting from the additional stress. Note that the long amplitude drop-out 218 of FIG. 2B has an increased amplitude drop relative to the long amplitude dropout 208 of FIG. 2A due to the additional stress.

The control circuitry 10 determines whether the second quality metric exceeds the second threshold THR 2 302 by processing the second read back signal 210 comprising defective second data 212 and comparing the second quality metric to the second threshold THR 2 302. FIG. 3B illustrates a plot of example percent probability of defects detected versus defect threshold levels after additional stress is applied according to an embodiment of the present invention. As shown, the application of additional stress results in the defective second data 212 being shifted left relative to the defective first data 202 such that the defective second data 212 is detected as defective at the lower second threshold THR 2 302. As illustrated, there is a 100% probability that a defect is detected at the lower THR 2 302 in this embodiment.

The second threshold THR 2 302 may comprise a second percentage amplitude drop-out of the second read back signal 210. For example, THR 2 302 may equal a 25% amplitude drop-out from an expected or nominal amplitude according to an embodiment of the invention. Any appropriate percentage amplitude drop-out may be selected for THR 2 302 according to embodiments of the invention.

Note that in FIG. 3A, the first quality metric corresponding to defective first data 202 exceeds the first THR 1 300 but does not exceed the second THR 2 302, i.e. no data curve is illustrated for the defective first data 202 that intersects the THR 2 302. Thus, under a different methodology, the defective first data 202 may not have been confirmed as defective based on the first quality metric corresponding to defective first data 202 not exceeding the THR 2 302. Therefore, without the application of additional stress, a defect may not be detected, and the control circuitry 10 may command the disk drive 100 to move the head 50 to a new track to scan for a defect.

Figure 1B:
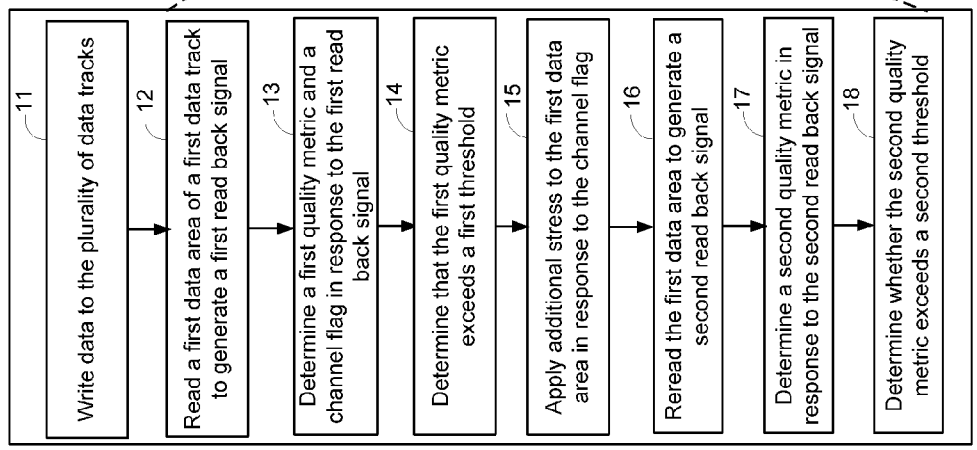
FIG. 1B is a flow diagram of acts executed by the control circuitry according to an embodiment of the present invention.
Figure 4:
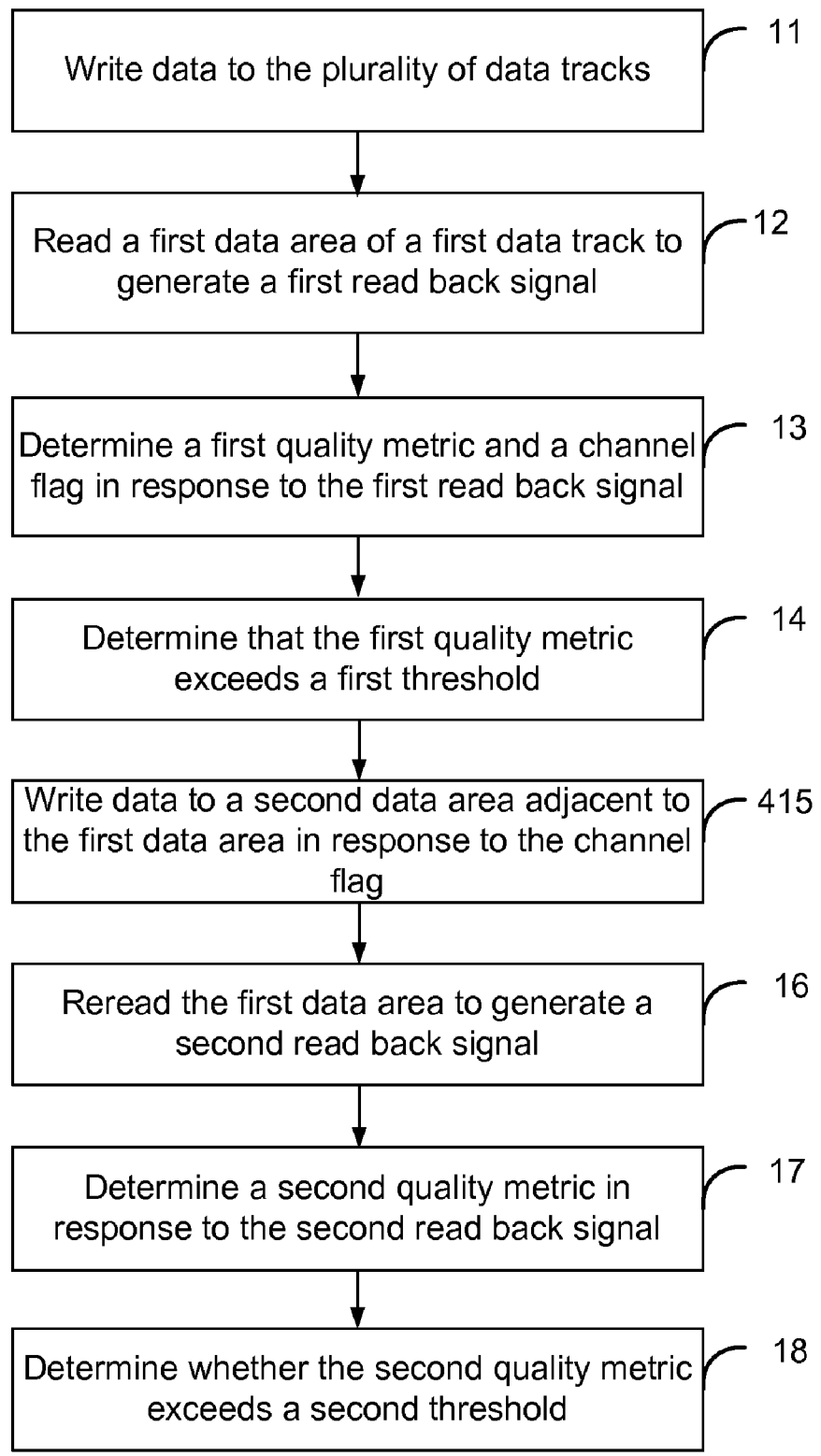
FIG. 4 illustrates a method executed by the control circuitry for detecting a defect by applying additional stress comprising M number of writes to corresponding data areas adjacent to the first data track according to one embodiment that enhances the method depicted in FIG. 1B.

FIG. 4 illustrates a method executed by the control circuitry 10 for detecting a defect by applying additional stress comprising M number of writes to data areas on tracks adjacent to the first data track according to one embodiment that enhances the method depicted in FIG. 1B. At block 415, the control circuitry 10 writes data to a second data area adjacent to the first data area in response to the channel flag. The control circuitry 10 may write data to the second data area M times. Application of the additional stress may comprise the control circuitry 10 analyzing the channel flag and commanding the disk drive 100 to perform ten writes to the second data area adjacent to the first data area. In one embodiment, the second data area may be located on a single neighboring track next to the first data track. In another embodiment, more than one data area may be written adjacent to the first data area, such as two data areas on either side of the first data area. Alternatively, the second data area may be offset N tracks from the first data track.

In one embodiment, the type and amount of stress may be adjusted according to information provided by the channel flag. In another embodiment, the control circuitry 10 analyzes the channel flag to identify the location of the defective data area on the first data track. The control circuitry 10 may also utilize the channel flag to identify and locate a second data area on data tracks adjacent to the first data track corresponding to the defective data area.

Figure 5:
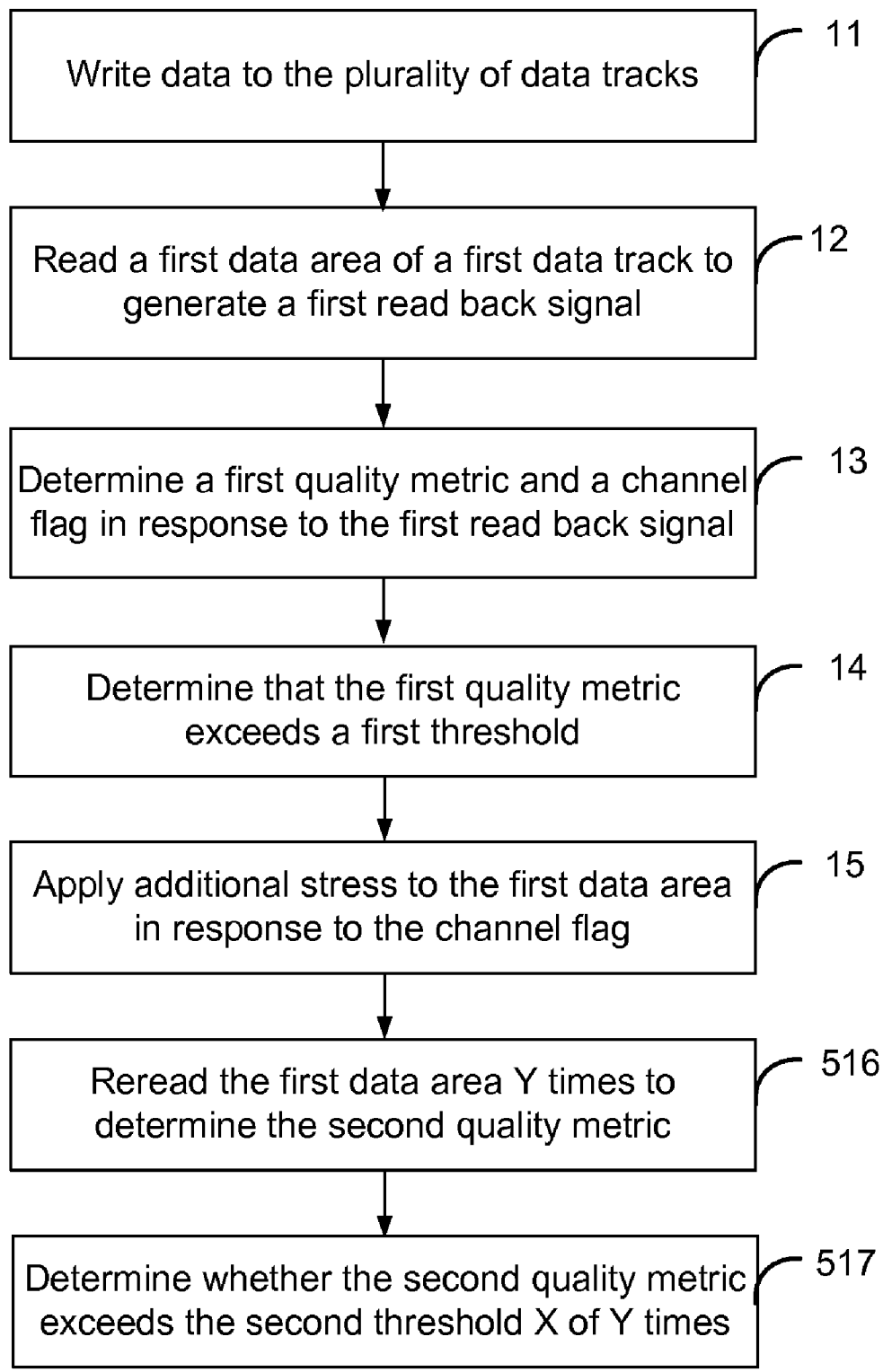
FIG. 5 illustrates a method executed by the control circuitry for detecting a defect by applying additional stress and Y number of additional rereads with comparisons to the second threshold according to one embodiment that enhances the method depicted in FIG. 1B.

After applying additional stress, the control circuitry 10 may perform multiple rereads and threshold comparisons. FIG. 5 illustrates a method executed by the control circuitry 10 for detecting a defect by applying additional stress and Y number of additional rereads with comparisons to the second threshold THR 2 302 according to one embodiment that enhances the method depicted in FIG. 1B. At block 15, the control circuitry 10 applies additional stress to the first data area in response to the channel flag. At block 516, the control circuitry 10 rereads the first data area Y times to determine the second quality metric, and at block 517, the control circuitry 10 detects the defect when the second quality metric exceeds the second threshold THR 2 302 X out of Y times. In one embodiment, any suitable ratio of X and Y, wherein X<Y may be used. For example, in one embodiment, a defect may be detected if the second quality metric exceeds the second threshold THR 2 302 in 6 out of 10 reread/comparisons.

As described above, the control circuitry 10 may utilize a channel flag generated by the read channel 24 to characterize a type of defect and determine a type of additional stress to apply. In one embodiment, any suitable additional stress may be applied. In one embodiment, the additional stress comprises at least one of adjusting a write current of the head, adjusting a read bias of the head, adjusting a fly-height of the head, adjusting a write current overshoot of the head, adjusting an equalizer parameter for configuring an equalizer circuit, adjusting a gain control parameter for configuring a gain control circuit, and applying an off-track write.

Figure 6:
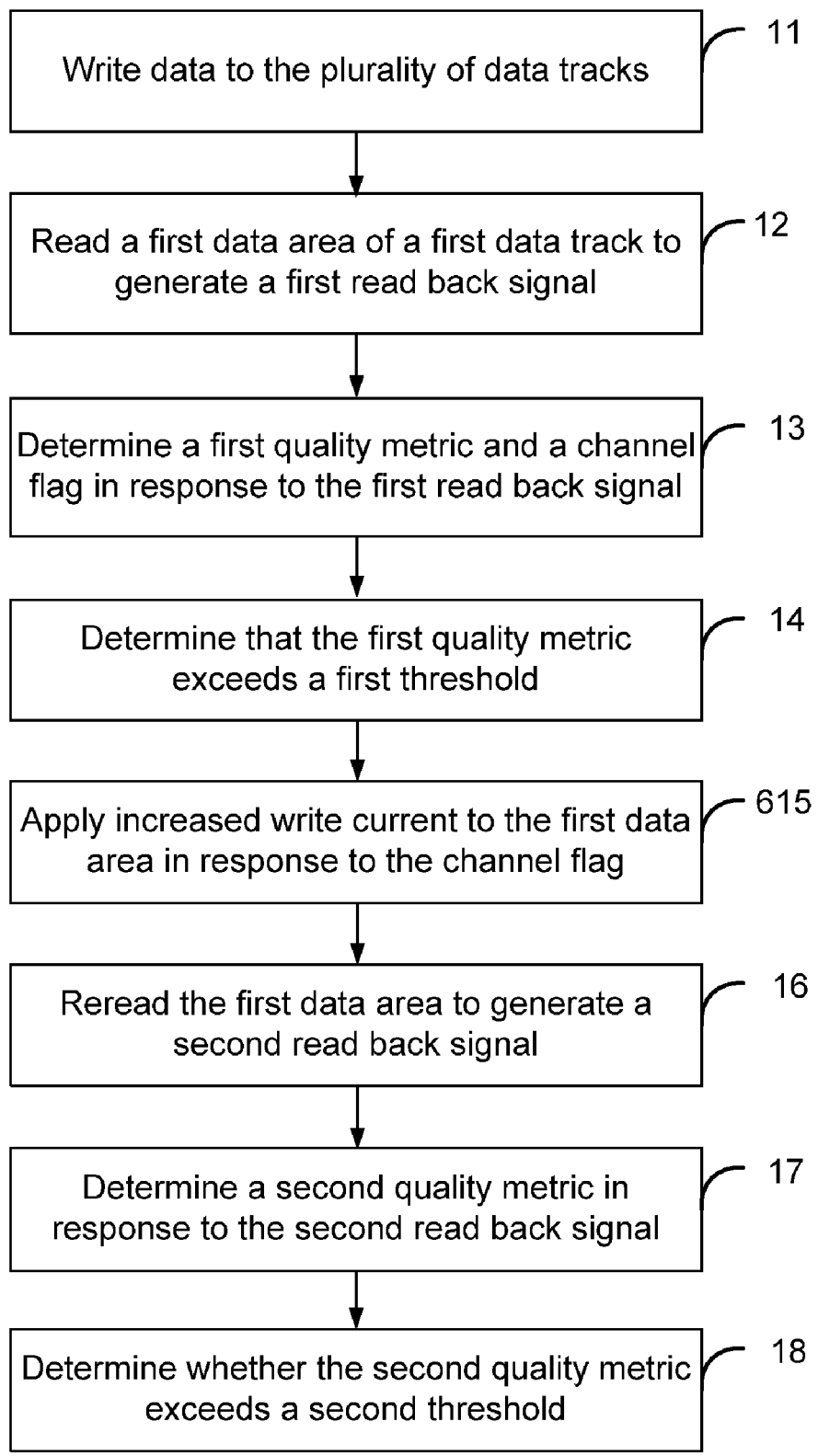
FIG. 6 illustrates a method executed by the control circuitry for detecting a defect by applying additional stress comprising increased write current to the first data area on the first data track according to one embodiment that enhances the method depicted in FIG. 1B.

FIG. 6 illustrates a method executed by the control circuitry 10 for detecting a defect by applying additional stress comprising an increased write current to the first data area on the first data track according to one embodiment that enhances the method depicted in FIG. 1B. At block 615, the control circuitry 10 applies increased write current to the first data area in response to the channel flag. In one embodiment, the increased write current may be applied to the first data area by rewriting the first data area at an increased write current level. Alternatively, the increased write current may be applied while writing data M number of times to a second data area adjacent to the first data area. Adjacent may comprise the same track or an adjacent track.

For example, FIG. 7A illustrates an example first read back signal 700 corresponding to data written in a first data area according to an embodiment of the present invention. The first read back signal 700 may comprise 2T data read from the first data area of the first data track. The data comprises defective first data 702 read from a defective data area and second non-defective data 704 read from a second non-defective data area of the first data area of the first data track.

The control circuitry 10 may determine that the channel flag indicates that the first read back signal 700 comprises a long "drop-in" 708 (a percentage amplitude increase or drop-in for P periods of the first read back signal 700), such as shown in FIG. 7A. A "drop-in" defect may be characterized by increased amplitude of a read back signal measured while the head is over the defect. Based on information provided by the channel flag, the control circuitry 10 may determine to apply additional stress comprising an increased write current to the first data area on the first data track to accentuate the defect.

FIG. 7B illustrates an example second read back signal 710 comprising defective second data 712 and the second non-defective data 704 resulting from applying additional stress comprising an increased write current to the first data area of the first data track according to an embodiment of the present invention. The second read back signal 710 comprises a long drop-in 718 with an increased percentage amplitude drop-in resulting from the increased write current stress. Note that the long drop-in 718 of FIG. 7B has an increased amplitude relative to the long drop-in 708 of FIG. 7A due to the application of additional stress comprising increased write current.

Figure 8:
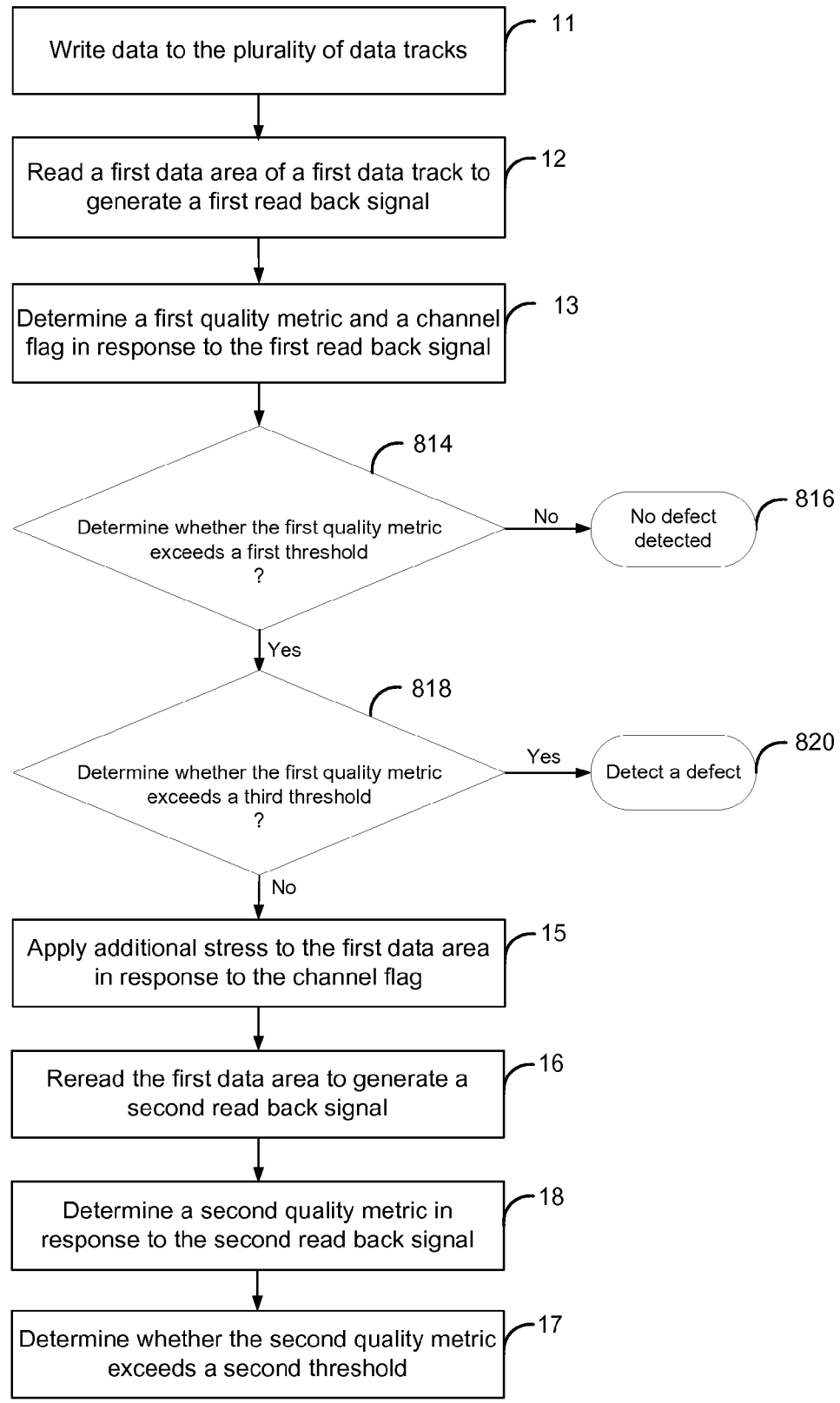
FIG. 8 illustrates a method executed by the control circuitry for detecting a hard defect according to one embodiment that enhances the method depicted in FIG. 1B.

The control circuitry 10 may also utilize a third threshold to detect a "hard" defect. A hard defect may be a defect that is detected at a lower threshold setting. Referring to FIG. 3A, the control circuitry 10 may utilize a third threshold THR 3 310 lower than THR 1 300 and THR 2 302 to detect a defect. FIG. 8 illustrates a method executed by the control circuitry 10 for detecting a hard defect according to one embodiment that enhances the method depicted in FIG. 1B. At block 814, if the control circuitry 10 determines that the first quality metric does not exceed the first threshold THR 1 300, no defect is detected (block 816). Otherwise, the method continues to block 818 wherein if the control circuitry 10 determines that the first quality metric exceeds the third threshold THR 3 310, a defect is detected (block 820). Otherwise, the control circuitry 10 determines that the first quality metric does not exceed the third threshold THR 3 310 and the method continues with blocks 15-17 as previously described above in relation to FIG. 1B.

Any number of defects or error types may be detected in embodiments of the present invention. For example, a "deep" defect or "shallow" defect refer to larger and smaller percentage amplitude drop-outs of the read back signal, respectively. Other types of defects may include, for example, the "drop-in" defects wherein the amplitude of the read back signal increases over the defect, or defects that cause timing errors (phase shift in the read signal). Defects may be further characterized as correlating to either "short" or "long" duration drop-outs or drop-ins of the read back signal. For example, in some embodiments, a long drop-out may comprise 32-64 periods of a read back signal whereas a short drop-out may comprise less than 32 periods of a read back signal. Alternatively, a long drop-out may correspond to an entire sector or wedge of defective data. The duration (i.e., number of periods) of either "short" or "long" drop-outs or drop-ins may be application specific, hard drive specific, or user defined.

A long drop-out may be further characterized as a percentage averaged amplitude decrease for P periods of the read back signal. In some embodiments, a long drop-out may correspond to a smaller averaged amplitude decrease relative to a short drop-out. In other embodiments, the reverse may be true. Thus, defects that may be identified by channel flags may comprise at least one of a long drop-out, a long drop-in, a short drop-out, a short drop-in, a timing error, and a thermal asperity error of the read back signal. Additional channel flags identifying other defects may be used as well.

Referring to FIG. 1A, the read/write channel 24 may comprise multiple detectors to process the read back signal 26. Each detector may be capable of providing a unique channel flag. Thus, the read/write channel 24 may comprise a separate detector for providing a unique flag for each of a long drop-out, a long drop-in, a short drop-out, a short drop-in, a timing error, and a thermal asperity error of the read back signal. For example, in one embodiment the read/write channel 24 may comprise a detector to provide a channel flag corresponding to a long drop-out. The long drop-out channel flag may correspond to a percentage averaged amplitude decrease for 64 periods of the first read back signal 200 that exceeds a first threshold THR 1 300. Additional channel detectors may be used as well.

Various defect type/channel flag/applied stress combinations may be analyzed and controlled by control circuitry 10. In one embodiment, in response to a channel flag corresponding to a defect, the read bias of the head may be adjusted via a bias current setting for a magnetoresistive (MR) element, wherein the additional stress comprises adjusting a magnitude of the bias current. In another embodiment, in response to a channel flag, the fly-height of the head is adjusted using a dynamic fly height heater for heating the head in order to adjust the fly-height, wherein the additional stress comprises writing data to the first data area at a reduced or expanded fly height. In another embodiment, in response to a channel flag, a write current overshoot is adjusted and the additional stress may comprise a magnitude or duration of write current overshoot applied to the head while writing to the first data area and/or adjacent tracks.

In one embodiment, the gain control circuit and equalizer circuit are implemented within a read channel, wherein the gain control adjusts an amplitude of the read signal emanating from the head, and the equalizer filters the read signal according to a target response. In this embodiment, in response to a channel flag, the additional stress may comprise adjusting a target amplitude for the read signal used to generate the error for adjusting the gain of the gain control circuit. In another embodiment, the additional stress may comprise adjusting a coefficient of the equalizer, or a target response of the equalizer.

The additional stress may be calibrated during a manufacturing process within a calibration disk drive (or disk drives) according to an embodiment. For example, the calibration procedure may be executed on a subset of a family of disk drives to determine the optimal setting for the additional stress, and the calibrated setting is then copied to each production disk drive.

In one embodiment, each production disk drive comprises a plurality of defect detection circuits or algorithms corresponding to different types of defects, and in one embodiment, a defect threshold is calibrated for each type of defect according to the embodiments described above. In yet another embodiment, each production disk drive executes the defect scan in multiple and/or parallel passes, wherein during each pass a particular defect (or defects) is targeted. Prior to each pass, the control circuitry 10 may configure the disk drive 100 to apply additional stress according to the embodiments described above.

In one embodiment, multiple combinations of channel flags may be analyzed by control circuitry 10 in order to determine multiple combinations of additional stress to apply. For example, the occurrence of a short drop-in channel flag and a timing error channel flag in response to a read back signal may cause the control circuitry 10 to decrease a fly height of the head 50 and apply an increased write current stress to a corresponding area of an adjacent track.

We claim:

1. A disk drive comprising:
a disk comprising a plurality of data tracks;
a head actuated over the disk; and
control circuitry coupled with the head operable to:
write data to the plurality of data tracks;
read a first data area of a first data track to generate a first read back signal;
determine a first quality metric and a channel flag in response to the first read back signal;
determine that the first quality metric exceeds a first threshold and is below a third threshold;
apply additional stress to the first data area;
reread the first data area to generate a second read back signal;
determine a second quality metric in response to the second read back signal; and
determine whether the second quality metric exceeds a second threshold.

2. The disk drive as recited in claim 1, wherein when the second quality metric exceeds the second threshold, detect the defect in the first data area of the first data track.

3. The disk drive as recited in claim 1, wherein the first and second quality metric comprise percentage amplitude drop-outs of the read back signal.

4. The disk drive as recited in claim 1, wherein the first threshold comprises a first percentage amplitude drop-out of the read back signal.

5. The disk drive as recited in claim 1, wherein the control circuitry is further operable to reread the first data area Y times to determine the second quality metric and detect the defect when the second quality metric exceeds the second threshold X of Y times.

6. The disk drive as recited in claim 1, wherein each data track comprises a plurality of data wedges defined by a plurality of servo sectors and the control circuitry is operable to read data from each data wedge and detect the defect in one of the data wedges.

7. The disk drive as recited in claim 1, wherein control circuitry coupled with the head operable to apply additional stress to the first data area comprises control circuitry operable to adjust a write current of the head.

8. The disk drive as recited in claim 1, wherein control circuitry coupled with the head operable to apply additional stress to the first data area comprises control circuitry operable to adjust a fly-height of the head.

9. The disk drive as recited in claim 1, wherein control circuitry coupled with the head operable to apply additional stress to the first data area comprises control circuitry operable to adjust a write current overshoot of the head.

10. The disk drive as recited in claim 1, wherein the control circuitry is further operable to determine that the first quality metric is below the third threshold, wherein the third threshold indicates a hard defect.

11. The disk drive as recited in claim 1, wherein the control circuitry comprises a read/write channel.

12. A disk drive comprising:
a disk comprising a plurality of data tracks;
a head actuated over the disk; and
control circuitry coupled with the head operable to:
   write data to the plurality of data tracks;
   read a first data area of a first data track to generate a first read back signal;
   determine a first quality metric and a channel flag in response to the first read back signal;
   determine that the first quality metric exceeds a first threshold;
   apply additional stress to the first data area;
   reread the first data area to generate a second read back signal;
   determine a second quality metric in response to the second read back signal; and
   determine whether the second quality metric exceeds a second threshold,
   wherein the first and second quality metric comprise percentage amplitude drop-outs of the read back signal, and wherein the percentage amplitude drop-outs of the read back signal comprises an average value of an amplitude drop-out averaged over a sample period P of the read back signal.

13. A disk drive comprising:
a disk comprising a plurality of data tracks;
a head actuated over the disk; and
control circuitry coupled with the head operable to:
   write data to the plurality of data tracks;
   read a first data area of a first data track to generate a first read back signal;
   determine a first quality metric and a channel flag in response to the first read back signal;
   determine that the first quality metric exceeds a first threshold;
   apply additional stress to the first data area;
   reread the first data area to generate a second read back signal;
   determine a second quality metric in response to the second read back signal; and
   determine whether the second quality metric exceeds a second threshold, and
   wherein the control circuitry coupled with the head operable to apply additional stress to the first data area comprises control circuitry operable to apply additional stress to the first data area in response to the channel flag.

14. The disk drive as recited in claim 13, wherein the channel flag represents at least one of a long drop-out, a long drop-in, a short drop-out, a short drop-in, a timing error, and a thermal asperity error of the read back signal.

15. A disk drive comprising:
a disk comprising a plurality of data tracks;
a head actuated over the disk; and
control circuitry coupled with the head operable to:
   write data to the plurality of data tracks;
   read a first data area of a first data track to generate a first read back signal;
   determine a first quality metric and a channel flag in response to the first read back signal;
   determine that the first quality metric exceeds a first threshold;
   apply additional stress to the first data area;
   reread the first data area to generate a second read back signal;
   determine a second quality metric in response to the second read back signal; and
   determine whether the second quality metric exceeds a second threshold, and
   wherein the control circuitry coupled with the head operable to apply additional stress to the first data area comprises control circuitry operable to write data to a second data area adjacent to the first data area in response to the channel flag.

16. The disk drive as recited in claim 15, wherein control circuitry is further operable to write data to the second data area M times.

17. The disk drive as recited in claim 16, wherein the second data area is offset N tracks from the first data track.

18. The disk drive as recited in claim 17, wherein the second data area is determined by analyzing the channel flag generated in response to the read back signal.

19. A method of detecting a defect on a disk comprising:
writing data to a plurality of data tracks on the disk;
reading a first data area of a first data track to generate a first read back signal;
determining a first quality metric and a channel flag in response to the first read back signal;
determining that the first quality metric exceeds a first threshold and is below a third threshold;
applying additional stress to the first data area;
rereading the first data area to generate a second read back signal;
determining a second quality metric in response to the second read back signal; and
determining whether the second quality metric exceeds a second threshold.

20. The method as recited in claim 19, further comprising detecting the defect in the first data area of the first data track when the second quality metric exceeds the second threshold.

21. The method as recited in claim 19, wherein the first and second quality metric comprise percentage amplitude drop-outs of the read back signal.

22. The method as recited in claim 19, wherein the first threshold comprises a first percentage amplitude drop-out of the read back signal.

23. The method as recited in claim 19, wherein the channel flag represents at least one of a long drop-out, a long drop-in, a short drop-out, a short drop-in, a timing error, and a thermal asperity error of the read back signal.

24. The method as recited in claim 19, further comprising rereading the first data area Y times to determine the second quality metric and detecting the defect when the second quality metric exceeds the second threshold X of Y times.

25. The method as recited in claim 19, wherein applying additional stress further comprises adjusting at least one of a write current of a head, a read bias of a head, a fly-height of a head, a write current overshoot of a head, an equalizer parameter for configuring an equalizer circuit, and a gain control parameter for configuring a gain control circuit.

26. The method as recited in claim 19, further comprising determining that the first quality metric is below the third threshold, wherein the third threshold indicates a hard defect.

27. A method comprising:
writing data to a plurality of data tracks on the disk;
reading a first data area of a first data track to generate a first read back signal;
determining a first quality metric and a channel flag in response to the first read back signal;
determining that the first quality metric exceeds a first threshold;
applying additional stress to the first data area, wherein applying additional stress comprises applying additional stress in response to the channel flag;
rereading the first data area to generate a second read back signal;
determining a second quality metric in response to the second read back signal; and
determining whether the second quality metric exceeds a second threshold.

28. A method comprising:
writing data to a plurality of data tracks on the disk;
reading a first data area of a first data track to generate a first read back signal;
determining a first quality metric and a channel flag in response to the first read back signal;
determining that the first quality metric exceeds a first threshold;
applying additional stress to the first data area, wherein applying additional stress comprises writing data to a second data area adjacent to the first data area in response to the channel flag;
rereading the first data area to generate a second read back signal;
determining a second quality metric in response to the second read back signal; and
determining whether the second quality metric exceeds a second threshold.

29. The method as recited in claim 28, further comprising writing data to the second data area M times.

30. The method as recited in claim 29, wherein the second data area is offset N tracks from the first data track.

31. The method as recited in claim 30, wherein the second data area is determined by analyzing the channel flag generated in response to the read back signal.

* * * * *